United States Patent [19]
Wirth et al.

[11] Patent Number: 5,546,378
[45] Date of Patent: Aug. 13, 1996

[54] FAULT TOLERANT FDDI WIRING HUB

[75] Inventors: Brian Wirth, Ottawa; Tom Duxbury, Kanata, both of Canada

[73] Assignee: Newbridge Networks Corporation, Kanata, Canada

[21] Appl. No.: 278,328

[22] Filed: Jul. 21, 1994

[51] Int. Cl.[6] .................................. H04J 3/02; H04J 3/14
[52] U.S. Cl. .................. 370/16.1; 370/85.12; 370/85.14; 370/94.1; 370/94.3; 340/825.25; 340/825.05; 395/182.01
[58] Field of Search .......................... 370/16, 16.1, 58.1, 370/58.2, 58.3, 60, 85.5, 85.9, 85.11, 85.12, 85.13, 85.14, 85.15, 94.1, 94.3; 340/825.02, 826, 825.05; 395/180, 181, 182.01, 182.02, 183.01, 183.03

[56] References Cited

U.S. PATENT DOCUMENTS

| | | | |
|---|---|---|---|
| 4,951,280 | 8/1990 | McCool et al. | 370/16.1 |
| 5,065,397 | 11/1991 | Shiobara | 370/85.12 |
| 5,084,870 | 1/1992 | Hutchison et al. | 370/94.1 |
| 5,144,293 | 9/1992 | Rouse | 340/825.02 |
| 5,187,706 | 2/1993 | Frankel et al. | 370/16.1 |
| 5,317,198 | 5/1994 | Husbands | 370/16.1 |
| 5,317,569 | 5/1994 | Ralph et al. | 370/85.12 |
| 5,351,040 | 9/1994 | Matsuura et al. | 340/825.05 |
| 5,379,291 | 1/1995 | Herzberg et al. | 370/94.3 |
| 5,388,099 | 2/1995 | Poole | 370/85.12 |

*Primary Examiner*—Alpus H. Hsu
*Attorney, Agent, or Firm*—Marks & Clerk

[57] ABSTRACT

A wiring hub for interconnecting a plurality of switching units, includes a plurality of interface modules for connection to respective external switching units in a dual-attached connection, and a dual FDDI ring interconnecting the interface modules. The interface modules include a switching element operable to bypass each switching unit or insert it on the ring in a dual-attached connection. The switching element automatically switches the interface module to its bypass state when a switching unit is disconnected from the wiring hub.

8 Claims, 3 Drawing Sheets

FAULT TOLERANT FDDI WIRING HUB

BACKGROUND OF THE INVENTION

This invention relates to FDDI networks, and more particularly to a low cost, fault tolerant FDDI wiring Hub.

FDDI (Fiber Distributed Data Interface) is a high speed data interface designed with Fiber optics in mind, although of course the interface can be used with other transmission media, such as shielded twisted pair lines.

Traditional FDDI networks use two methods to interconnect stations: point to point connection of dual-attached stations in a ring topology; or connection of single-attached stations to an FDDI concentrator in a star topology.

Point to point connection retains the fault tolerance of FDDI but is difficult to maintain. The ring topology is essential in the networks ability to recover from a fault. Removal or addition of a station involves re-wiring a portion of the network to maintain the proper topology. During this time, the network is unable to recover from a fault.

Intelligent FDDI concentrators connect single-attached stations in a star configuration. They are relatively expensive and can be a single point of failure in an FDDI network since each station only has one connection to the ring rather than two. Replacement of a faulty concentrator results in a disruption of service for all stations connected to that concentrator.

Neither of these interconnect methods are adequate for backplane applications where reliability and ease of reconfiguration are important.

SUMMARY OF THE INVENTION

An object of the invention is to alleviate the aforementioned problems by providing the configuration flexibility of a star-wired network while maintaining the fault tolerance of dual-attached stations on the FDDI ring.

Accordingly the present invention provides a wiring hub for providing interconnection at a physical medium dependent layer only in an FDDI network of a plurality external FDDI stations, comprising: a common chassis; a plurality of internal interface modules on said common chassis for connection to respective external FDDI stations in a dual-attached connection; internal transmission paths in said wiring hub forming a primary ring and a secondary ring and interconnecting said interface modules in a manner consistent with FDDI ring topology to permit a dual-attached FDDI ring to be established through said external FDDI stations and said internal transmission paths; and said interface modules including a switching element operable to bypass each external FDDI station or insert it on said dual-attached ring in a dual-attached connection, said switching element automatically switching its interface module to a bypass state when a said external FDDI station is disconnected from the wiring hub.

In a preferred embodiment, the FDDI stations are high speed frame relay switches.

When a station is disconnected from its interface module, the module automatically switches to the bypass state restoring the dual FDDI ring. If an interface module fails, the FDDI ring will wrap around it and maintain operation of the remaining stations. The interface module may be replaced without any further disruption of service.

Low cost is achieved by preferably using shielded twisted pair cable rather than fiber optics.

Power for each interface module comes from the station to which it is connected. The lack of a centralized power supply means that a failure will only affect a single station, not the entire wiring hub.

Stations may be added or removed from the network by simply plugging or unplugging them from the hub. When a station is connected to the hub and inserted on the ring, it is a full dual-attached station with all the advantages of point to point connection with its neighbors. When a station is connected to the hub, and not inserted on the ring, it can perform a link confidence test on its connection to the hub while the remainder of the stations remain connected in a full dual-ring. The station therefore has the same advantages as being connected to an intelligent concentrator but with the added improvement of being dual attached.

This FDDI wiring hub may be used in twisted pair based FDDI networks where low cost and fault tolerance are primary concerns.

BRIEF DESCRIPTION OF THE DRAWINGS

The invention will now be-described in more detail, by way of example only, with reference to the accompanying drawings, in which.

DESCRIPTION OF THE PREFERRED EMBODIMENTS

Figure 1:
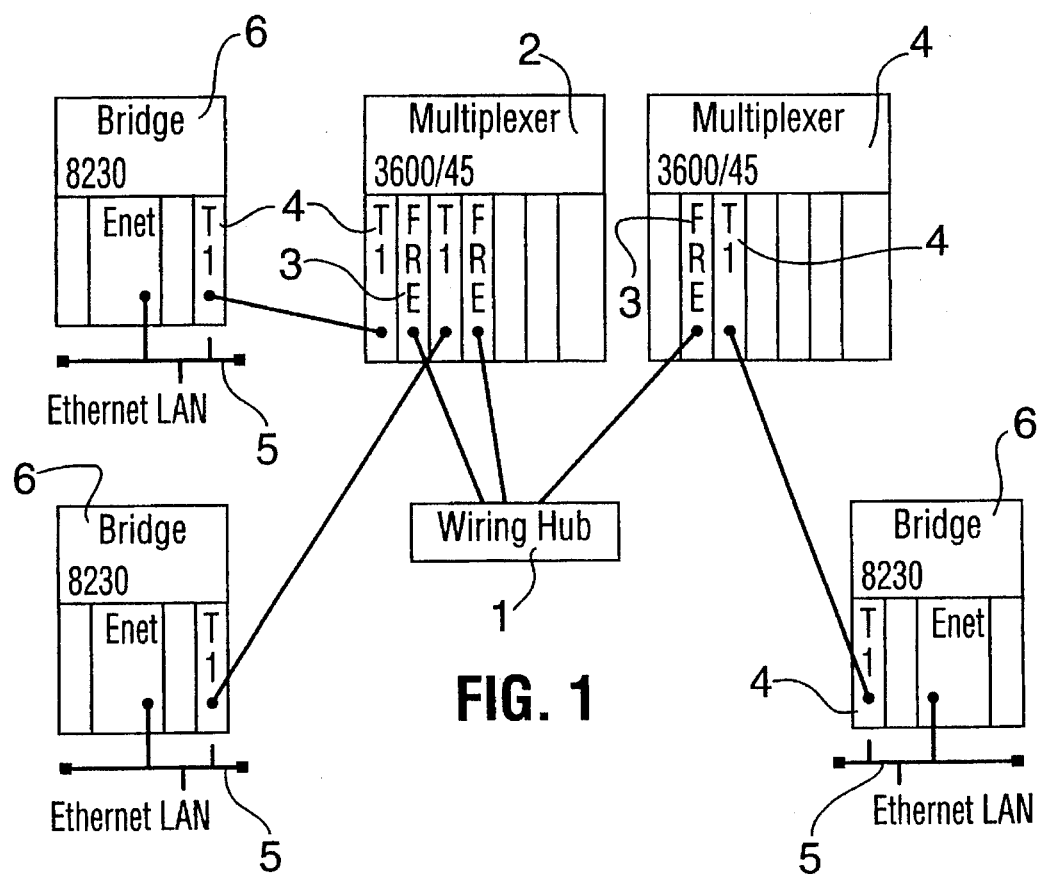
FIG. 1 is an example of one application of a wiring hub in accordance with the invention.

FIG. 1 shows an application of the wiring hub or FIP (FASTbus Interconnect panel) 1 in accordance with the invention. As shown in FIG. 1, the wiring hub 1 is connected to two FRE (Frame relay Engine) cards 3 in Newbridge Networks Corporation 3600 MainStreet® muliplexers 2, which are connected via T1 modules to 8230 MainStreet® bridges 6 that are connected to respective Ethernet™ LANs 5. The FRE cards 3 provide a high speed frame relay packet switching function.

The wiring hub 1 forms part of the Newbridge FASTbus™, which consists of high-capacity frame relay switches implemented in the 3600/3645 MainStreet® product, linked by a high-bandwidth bus operating under the Newbridge 4602 MainStreet® Network Management system. This allows users to add Frame Relay Engine (FRE) cards to the network map, configure them, connect them on the map via a 36120 MainStreet® node, and route frame relay paths (FRPs) over them from a single network node using the 4602 MainStreet® system.

In the network shown in FIG. 1, wiring hub 1 provides the center of a frame relay network. User data is assembled into frame relay packets on the 8230 MainStreet® Ethernet Bridges 6. The packets are switched in 3600 MainStreet® or 3645 MainStreet® nodes two by FRE cards 3, such that they travel to other FRE cards 3 via the wiring hub 1, and are eventually disassembled into user data on another 8230 MainStreet® bridge 6.

Figure 2:
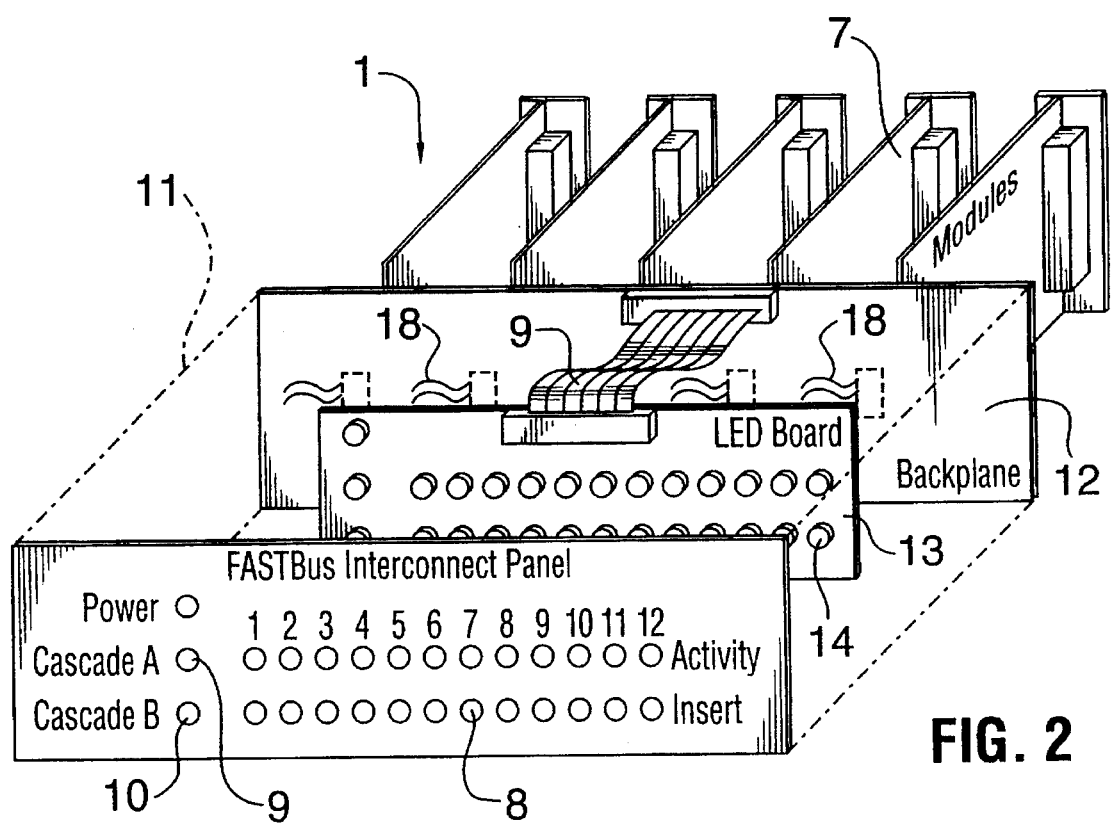
FIG. 2 is an exploded view of a wiring hub assembly in accordance with the invention.

The wiring hub 1, which is shown in more detail FIG. 2, is intended to be a low cost product for interconnecting Frame Relay Engine (FRE) cards on an FDDI ring. It provides the interconnection at the Physical Medium Dependent (PMD) layer as opposed to the Physical (PHY) layer of FDDI. As such, it is strictly a wiring hub, as opposed to a true FDDI Concentrator.

The wiring hub 1 consists of a 19" rack mount chassis 1 with twelve plug-in interface modules 7, i.e. one for each port, and with the FRE cards 3 forms a dual FDDI ring 15 consisting of primary ring 15a and secondary ring 15b. There are thus 12M ports for connection to FRE cards, an A port, a B port and a spare. The A and B ports are used to cascade wiring hubs into larger systems as be be explained in more detail below. An unconnected spare port is available to store an extra module.

The interface modules 7 are connected to the FRE cards 3 by shielded twisted pair cable 17 (STP), which forms part of a dual-attached FDDI ring through the FRE cards 3.

The metal chassis 11 provides shielding for both EMI and ESD. The chassis 11 is well connected to ground. The rear of the chassis 11 provides two grounding points which may be used if the rack in which the hub is installed is not grounded. The module faceplates are screwed to the main chassis to provide mechanical support and to ensure that the faceplates and therefore the cable shields are well grounded.

The chassis contains a backplane 12, which provides the interconnection of the interface modules 7, and a separate board 13 containing the faceplate LEDs 14, which indicate the status of the ports of the wiring hub 1. A ribbon cable connects the LED board 13 to the backplane 12.

The function of the backplane 12 is to connect primary and secondary ring data of adjacent interface modules 7 at a data rate of 125 Mbps and to pass the LED signals from the interface modules 7 through to the LED board 13. This is done over microstrip transmission lines 18.

Figure 3:
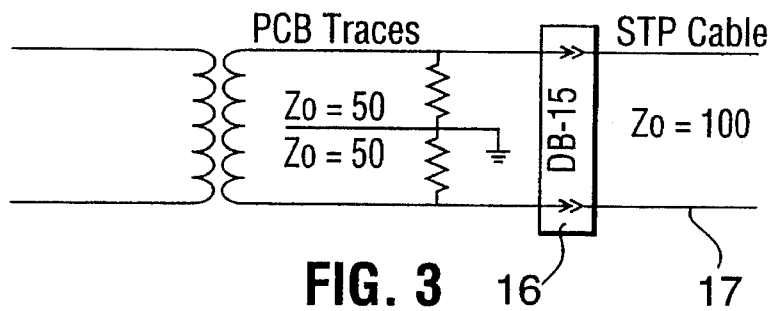
FIG. 3 shows an arrangement for matching the printed circuit board (PCB) trace impedance to the STP (Shielded Twisted Pair) cable of the FDDI ring.

In view of the high data rate, track impedance is important. Ideally, the trace impedance should match the STP (Shielded Twisted Pair) cable impedance of 100Ω. When considering balanced differential signals, the configuration shown in FIG. 3 properly matches the 100Ω cable to 100Ω (differential) traces. The track impedance (with respect to the ground plane) is as close as possible to 50Ω. The physical dimensions required to realize this impedance are calculated on the basis of the following formula for a microstrip transmission line:

$$Z_0 = \frac{87}{\sqrt{E_r + 1.41}} \ln \frac{5.98h}{0.8W + t}$$

Where:

$Z_0$=impedance of line (½)

$E_r$=dielectric constant h=distance between signal line and reference plane (in)

W=width on line (in)

t=thickness of line (in)

Using a nominal 0.010 in. dielectric thickness, a trace of width 0.017 in. will result in a trace impedance of 49.9Ω. This is well within the impedance tolerance which most PCB shops will guarantee.

The routing of the signals is also important and should be as short as possible with signal pairs routed adjacent and parallel to each other. Shielding to reduce crosstalk is provided by routing a GND (ground) trace between adjacent pairs where necessary. This GND trace will be connected to the GND plane about every 1" to ensure an adequate shield.

Figure 4:
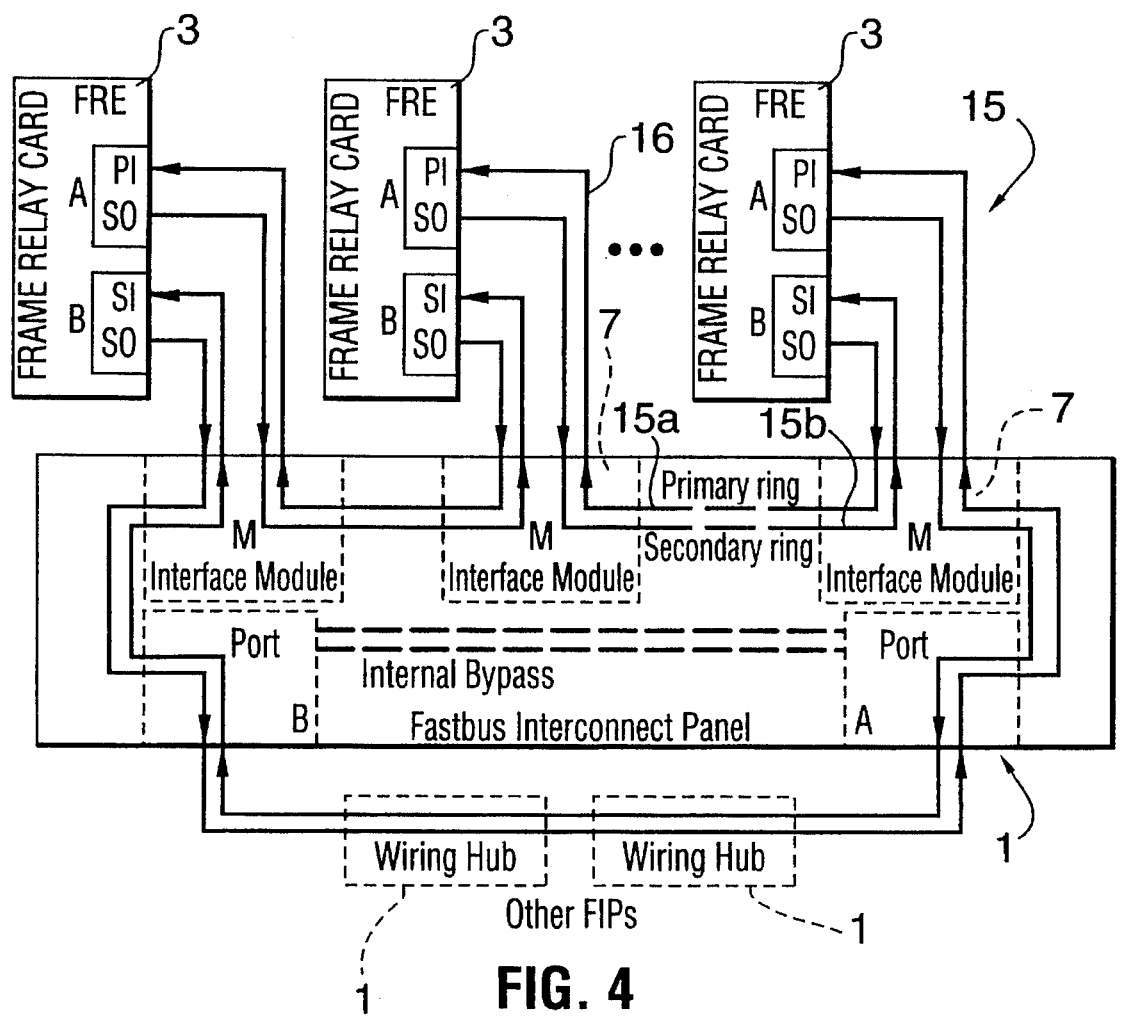
FIG. 4 shows the interface modules connected in dual-attached ring topology.

As shown in FIG. 4, the FREs 3 are connected to the wiring hub by shielded twisted pair cable (STP) 16. Three interface modules 7 are shown connected to respective FRE cards 3.

The interface modules 7 actually consist of one or more different types of module, namely an STP Module for connection to the FRE cards 3 over the shielded twisted pair, a bypass module for bypassing unused module positions, an STP cascade module for cascading hubs together in high capacity systems, and Cascade Fiber Module for use when the distance between cascaded hubs is too great for twisted pair cable.

Figure 5:
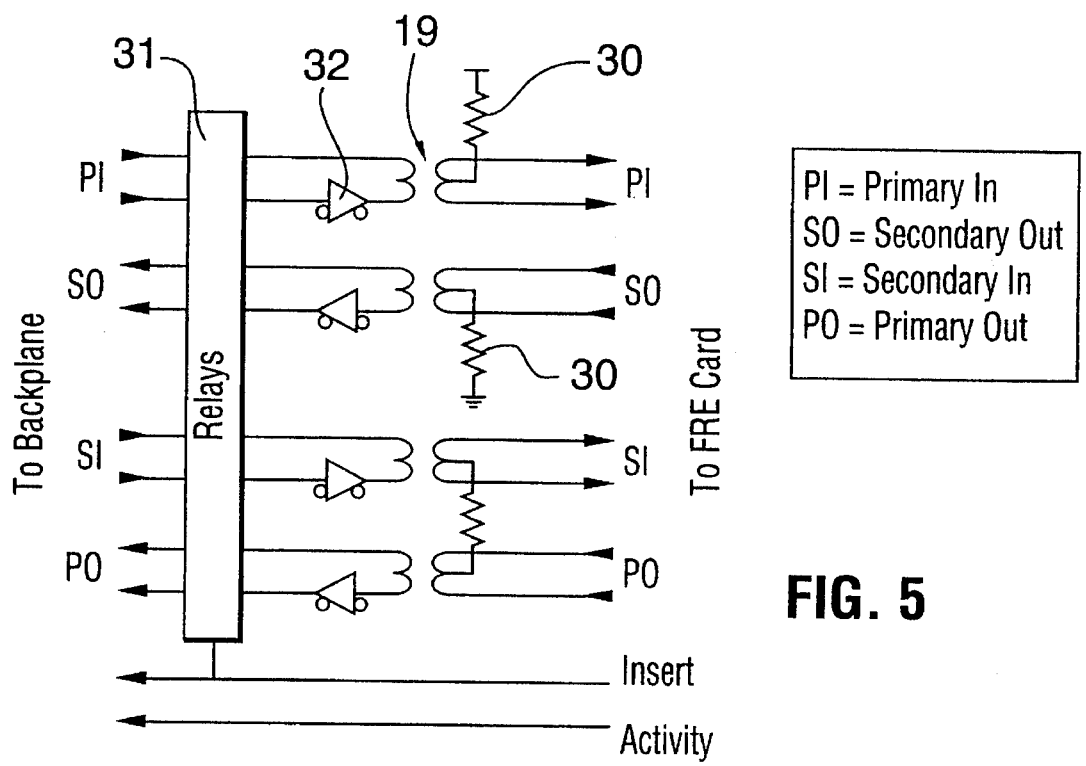
FIG. 5 shows an STP module for connection to an FDDI ring.

FIG. 5 shows an STP module in more detail. The cable from the FRE card 3 connects to a male DB-15 connector 16 (FIG. 3) on the interface module. When referring to signal names, all signals are named with respect to the FRE card to which they connect. For example, Primary In refers to the signals which drive the A-port receiver on the FRE card. On the interface module, the Primary In signals are outputs on the DB-15 that connects to the FRE card and inputs on the backplane connector.

Each STP module consists of relays 30 that are connected to the FRE card 3 via buffers 32 and transformers 19. The STP modules are energized when the FRE card 3 asserts its insert signal. Power to energize the relays 17 is provided by the FRE card 3 over the shielded twisted pair 17. Therefore, when no power is received (as when nothing is connected) the relays remain in a bypassed state. When the relays 31 are energized, an insert LED on the faceplate is driven.

An open collector activity signal from the FRE card 3 is passed through to the backplane to drive the corresponding faceplate LED.

Transmit and receive data are transformer coupled upon entering the module from the FRE card 3. This allows the module to terminate the common-mode cable detect signal appropriately for the FRE's A and B ports. The module must source cable detect current (from +12 V) on the Primary In pair and sink the cable detect current (to GND) on the Secondary Out pair. This mimics M-port cable detect. The Primary Out and Secondary In pairs mimic S-port cable detect by shunting the cable detect current from Primary Out to Secondary In. Using the M- and S-port cable detect methods in this way ensures that all four data pairs are correctly connected from the FRE card to the hub.

Transmit and receive data are connected directly to the hub backplane.

The bypass module (not shown) is installed in unused module positions to effectively bypass them. It simply connects the Primary In to Primary Out signals and the Secondary In and Secondary Out signals to complete the dual rings. This card contains only the backplane connector, an option resistor for the insert LED and a module faceplate. Bypass modules must be installed in all unused module positions (including cascade ports) to complete the dual ring.

Figure 6:
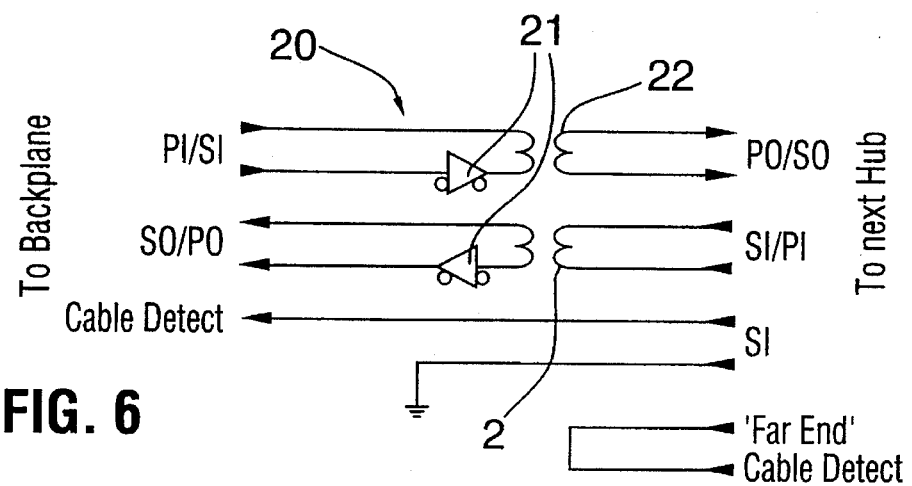
FIG. 6 shows a cascade module for use with a shielded twisted pair connection.

Cascade STP modules 20 (FIG. 6) are installed in the A and B ports of the Hub to link several hubs together using shielded twisted pair cable. This module uses a female DB-15 connector rather than the male DB-15 used on the STP modules to prevent improper cabling. The STP modules consist of buffers 21 and transformers 22.

Signal buffering is performed by this module in the same manner as the STP module. This ensures that the maximum hub to hub cable length can be met.

No relays are present on this module. If nothing is to be connected to the cascade port, then a bypass module is used in place of a cascade module. Depending upon which port this module is installed in, either the Primary In/Secondary Out or Secondary In/Primary Out set of signals is brought out to the connector. The modules themselves are identical, however, the backplane brings out the appropriate signals to the A and B cascade ports.

Separate cable detect between hubs is implemented. Extra wires in the cascade cables are used for this purpose. When a cascade cable is properly connected, the insert LED on the hub faceplate will be illuminated. The cable detect pair simply pulls the backplane LED signal low. To keep the hub grounds isolated, each hub uses a separate pair for cable detect.

Figure 7:
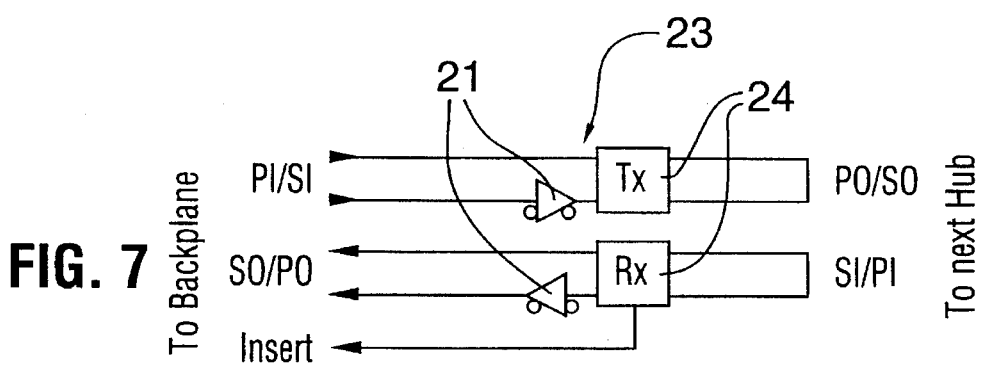
FIG. 7 shows a cascade module for use with a fiber optic connection.

If the distance between hubs is too great for twisted pair cable, fiber optics may be used in its place. The Cascade Fiber module 23 (FIG. 7) is similar in function to the Cascade STP 20 module but replaces the DB-15 with a pair of optical ST connectors 24.

Receive signal detect from the optical module is used to illuminate the cascade LED on the faceplate when this module is used. This indicates that a valid optical signal is being received and is indicative of proper cabling.

The described wiring hub provides a low cost, reliable, serviceable alternative to FDDI concentrators in applications where redundancy is not a strict requirement. Given the fault recovery mechanism employed by FDDI Station Management (SMT) software on the FRE cards, hub reliability becomes somewhat relaxed in the sense that the failure of virtually any hub component will not bring down the entire FDDI ring. The Station Management software can maintain an operational ring by wrapping the ring on each side of the failed equipment. The hub allows the failed components to be replaced while the ring remains operational.

In a single hub system, no failure of the wiring hub will cause a Class 1 system failure. This class of failure is defined as one in which 50% of the system's subscribers are down. In cascaded systems, loss of both cascade modules would result in isolating the group of FRE cards connected to that hub.

The described wiring hub thus provides an effective low-cost solution for FFDI networks. Some highlights of the solution are:

Automatically bypasses FRE cards if cables are removed or broken.

Uses relays to achieve high reliability and low cost on each module.

Requires no power supply—power is sourced from each FRE card.

Front panel LEDs give individual card insert and activity status.

Provides STP (Shielded twisted pair) or Fiber Optic interfaces for cascading hubs.

We claim:

1. A wiring hub for providing interconnection at a physical medium dependent layer only in an FDDI network of a plurality of external FDDI stations, comprising:

a common chassis;

a plurality of internal interface modules on said common chassis for connection to respective external FDDI stations in a dual-attached connection;

internal transmission paths in said wiring hub forming a primary ring and a secondary ring and interconnecting said interface modules in a manner consistent with FDDI ring topology to permit a dual-attached FDDI ring to be established through said external FDDI stations and said internal transmission paths; and said interface modules including a switching element operable to bypass each external FDDI station or insert it on said dual-attached FDDI ring in a dual-attached connection, said switching element automatically switching its interface module to a bypass state when a said external FDDI station is disconnected from the wiring hub.

2. A wiring hub as claimed in claim 1, wherein said dual-attached FDDI ring includes shielded twisted pair cable.

3. A wiring hub as claimed in claim 1, wherein the interface modules are powered by the FDDI stations.

4. A wiring hub as claimed in claim 1, wherein the interface modules comprise relays for receiving primary and secondary data from said FDDI stations.

5. A wiring hub as claimed in claim 1, wherein said FDDI stations are frame relay switch cards in a frame relay network.

6. A wiring hub as claimed in claim 1, wherein said interface modules are in the form of replaceable plug-in modules.

7. A wiring hub as claimed in claim 6, further comprising by-pass modules to replace said interface modules when no FDDI station is attached thereto.

8. A wiring hub as claimed in claim 1, wherein one of said interface modules comprises a cascade module for connection to a similar module in another wiring hub, whereby a plurality of wiring hubs can be cascaded together to increase switching capacity.

* * * * *